United States Patent [19]

Bardeen et al.

[11] Patent Number: 4,841,638
[45] Date of Patent: Jun. 27, 1989

[54] HAND-HELD CUTTING TOOL APPARATUS

[75] Inventors: John P. Bardeen, Denver, Colo.; Jerry K. Ellefson, Granite Shoals, Tex.

[73] Assignee: Pumpkin, Ltd., Denver, Colo.

[21] Appl. No.: 93,494

[22] Filed: Sep. 4, 1987

[51] Int. Cl.⁴ .............................................. A26B 1/00
[52] U.S. Cl. ...................................... 30/332; 30/337; 30/342; 30/517
[58] Field of Search ............... 30/517, 523, 524, 329, 30/332, 333, 337, 340, 342, 344; 7/167; 81/489, 491

[56] References Cited

U.S. PATENT DOCUMENTS

| 5,609 | 5/1848 | Chamberlain | 30/342 |
| 1,418,189 | 5/1922 | Kimball | 30/469 UX |
| 4,227,307 | 10/1980 | Meghulam | 30/342 |

FOREIGN PATENT DOCUMENTS 963021  6/1950  France .................................. 30/340

Primary Examiner—Douglas D. Watts
Attorney, Agent, or Firm—Timothy J. Martin; J. Preston Oxenham

[57] ABSTRACT

A small, hand-held cutting tool which is light in weight and easily manipulated for use in cutting relatively soft materials. The cutting tool apparatus described herein is especially useful for the decorative carving of pumpkins.

18 Claims, 2 Drawing Sheets

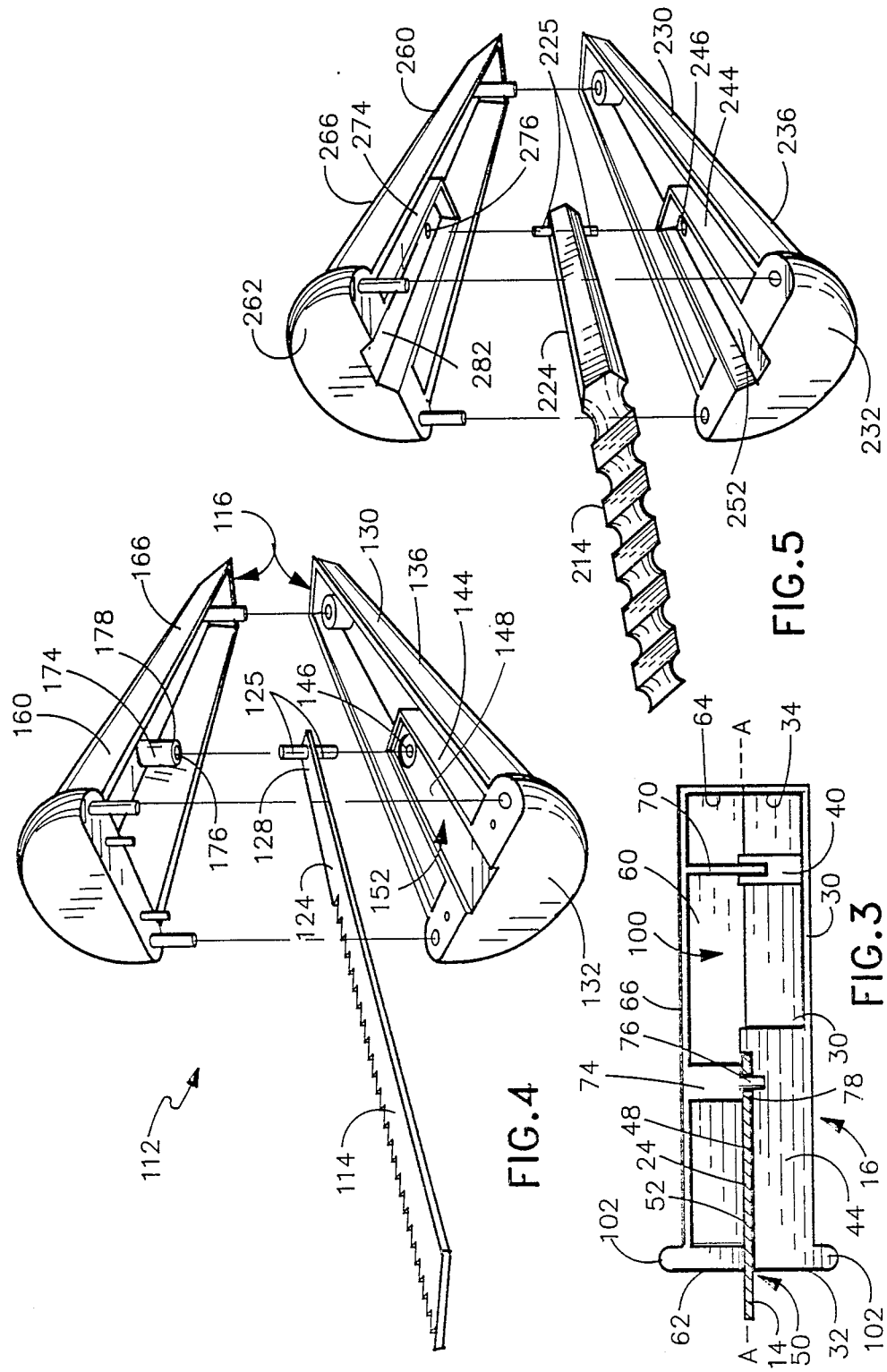

4,841,638

HAND-HELD CUTTING TOOL APPARATUS

BACKGROUND OF THE INVENTION

Carving pumpkins may be considered to be an art form requiring fairly delicate cutting of the flesh of the pumpkin, which is very soft working medium. Such cutting requires that the cutting tool be a hand-held cutting instrument which has heretofore usually been either a paring knife or pocket knife. The knife is manipulated to achieve the desired appearance by removing sidewall portions of the pumpkin flesh so that the pumpkin may be internally lit to create the desired appearance. Due to the size limitations and blade characteristics of these knives, pumpkin carving has generally been directed to the carving of major features without any attention to detail since only relatively linear cuts have been possible without damaging the pumpkin flesh.

SUMMARY OF THE INVENTION

It is an object of the present invention to provide a new and useful tool apparatus for cutting relatively soft materials wherein the tool apparatus may be employed in delicate carving procedures.

It is another object of the present invention to provide cutting tool apparatus that may be held by the fingers in a pencil-like manner whereby intricate cuts may be accomplished in relatively soft medium.

It is a further object of the present invention to provide a hand-held cutting tool apparatus which may be snap-fit together to provide a lightweight tool for cutting soft materials.

According to the present invention, then, a hand-held tool apparatus is provided which is adapted for cutting relatively soft materials such as a pumpkin. The tool apparatus comprises a tool element that has an elongated shank at one end and a cutting element at the other end. This tool element is mounted along a handle axis by an elongated handle assembly. The handle assembly has front and rear surfaces which extend transversely to the handle axis and an outer surrounding side surface that extends from the front to the rear surface. The handle assembly is operative to receive the tool element shank such that the cutting element projects outwardly and forwardly of the front surface.

The handle assembly is preferably constructed of complimentary handle sections. The first handle section has a first end portion transverse to the handle axis and a first central portion extending inwardly from a first side surface portion. A second handle section has a second end portion extending transversely of the handle axis and a second central portion extending inwardly from a second side portion. Securing means are provided for securing the first and second handle sections together such that the first and second end portions form the front surface and the first and second central portions have opposed internal faces spaced apart from one another to receive and support an inner end of said shank in close fitted engagement therebetween. The first and second end portions are configured whereby the front surface has an axial opening therethrough which is sized to receive the shank. Engageable mounting structure is provided on the inner end of the shank and cooperates with structure on the first and second portions to lockably secure the shank within the handle assembly when the first and second handle sections are secured together.

Preferably, the handle assembly is hollow so that the first and second portions form a front wall and first and second rear portions form a rear wall with the first and second side sidewalls having rims which are configured to abut one another when the handle sections are secured together in an assembled state. Preferably, the first central portion is formed as integral longitudinal extension of the first wall section with the opening through the front wall and the shank inner end support surface being formed by a longitudinal channel constructed along the top of the first central portion. Further, the handle sections are preferably connected by means of connecting posts and holes so that the handle sections will snap-fit together. The shaft may be secured within the handle assembly, in one embodiment, by means of a hole formed in the shank and by an interlocking and complementary post and bore formed on the first and second central portion so that the post extends through the hole in the shank. In an alternate embodiment, this mounting means is formed by a pair of oppositely projecting fingers on the shank which mateably engage holes on each of the first and second central portions. Finally, it is desirable that lateral angular movement of the shank be prohibited once it is secured within the housing assembly. To this end, a pair of prongs extend downwaardly from one of the handle sections to mate with bores on the other of the handle sections on the front portions thereof and on either side of the axial opening that receives the shank. These prongs provide limit stops to prevent the lateral angular deflection of the shank. The handle assembly, in the preferred construction, is in the form of a polygonal prism to provide ease in gripping the handle by the human hand, and an upstanding perimeter lip extends around the front of the handle portion whereby the user's fingers may rest allowing the user to exert forward longitudinal force.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 3 is a side view in cross-section of the tool assembly shown in FIG. 2 shown in the assembled state;

FIG. 4 is an exploded perspective view of a first alternate embodiment of a tool assembly according to the present invention; and FIG. 5 is an exploded perspective view of a second alternate embodiment of a tool assembly according to the present invention.

DETAILED DESCRIPTION OF THE PREFERRED EMBODIMENT

Figures 1, 2:
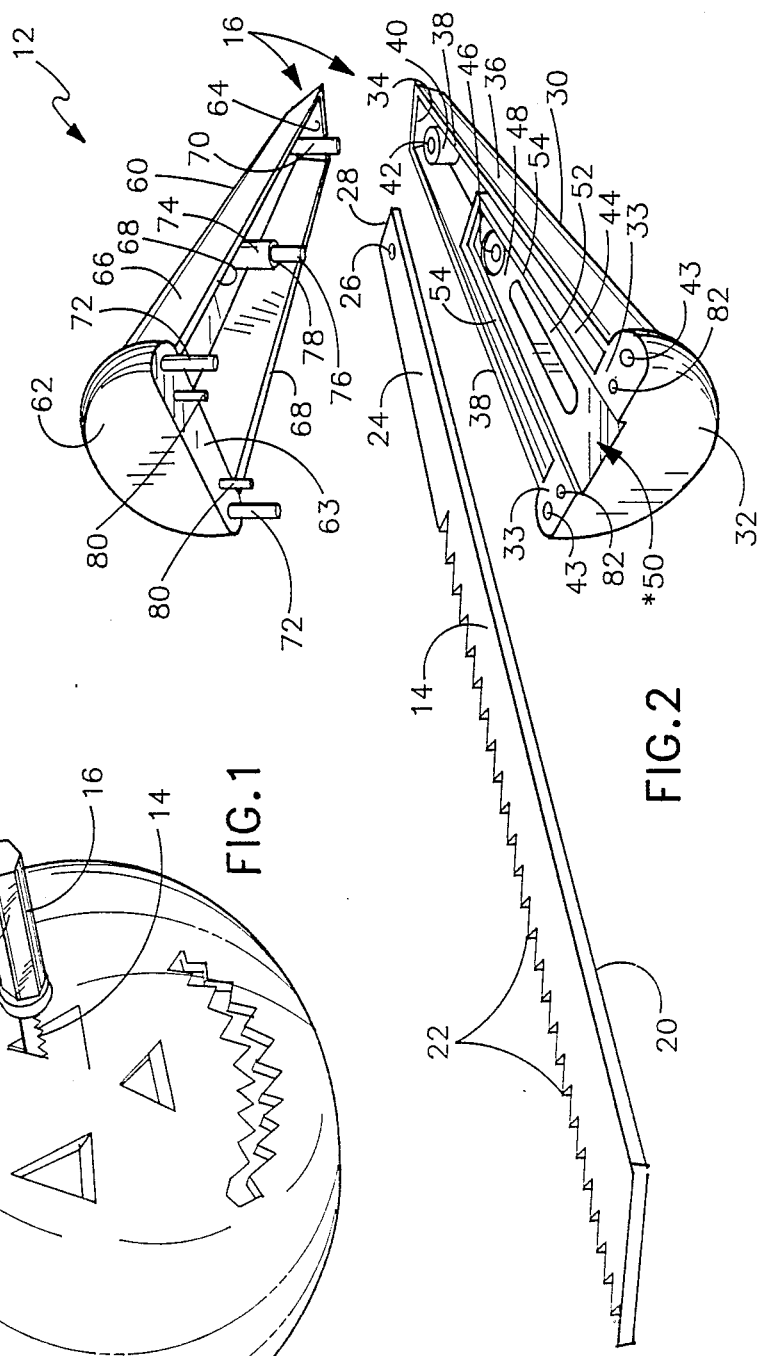
FIG. 1 is a perspective view of the tool assembly according to the preferred embodiment of the present invention ultilized in carving a pumpkin.
FIG. 2 is an exploded perspective view of the tool apparatus shown in FIG. 1 in a disassembled state.

The present invention relates to hand-held tool apparatus specifically adapted for cutting relatively soft materials. As such, the present invention is constructed to be gripped by a user's hands and held in a pencil-like manner for precisely making delicate cuts in a soft material, and this present invention is particularly useful for carving intricate designs on pumpkins for halloween. Thus, as is shown in FIG. 1, pumpkin 10 is being carved by the present invention in the form of tool apparatus 12. Tool apparatus 12 includes a handle assembly 16 which mounts a tool element 14. As is shown in FIG. 1, then, tool element 14 is inserted through the surface of pumpkin 10 so as to remove a portion of the fleshy body thereof.

The structure of tool apparatus 12 is shown in greater detail in FIGS. 2 and 3. Here, it may be appreciated that tool element 14 is formed to have a cutting element 20 which, in the embodiment shown in FIGS. 2 and 3, is in the form of a saw having a serrated edge formed by teeth 22. Tool element 14 also includes an elongated shank 24 which is in the form of a flat plate-like member which forms one end of the tool element 14 projecting oppositely of cutting element 20. Shank 24 includes a hole 26 formed adjacent inner end 28.

Handle assembly 16 is constructed as a first handle section 30 and a second handle section 60. First handle section 30 has a front end portion or front wall 32 that extends transversely to handle axis A and a rear wall section 34 that also extends transversely to axis A as is shown in FIGS. 1 and 3. A first sidewall section 36 extends between front and rear wall sections 32 and 34 to form a trough-shaped member having a first rim 38 extending around the upper perimeter of first handle section 30. Similarly, second handle section 60 includes a second front wall section 62, a second rear wall section 64 and a second sidewaall section 66 which extends between second front wall section 62 and second rear wall section 64. Second handle section 60 is thus configured as a complementary trough-shaped member having a rim 68 that is configured to correspond to rim 38 such that first and second handle sections 30 and 60 may be positioned together with rims 38 and 68 abutting one another with handle assembly 16 thus having a generally hollow interior 100 as is shown in FIG. 3. Front wall sections 32 and 62, when assembled, provide a radially outwardly projecting lip 102 to provide a finger stop to prevent the user's fingers from sliding of of handle assembly 16.

In order to form handle assembly 16, then, it is necessary that securing means be provided to secure first and second handle sections 30 and 60 together. To this end, first handle section 30 is provided with an upstanding post 40 which extends radially upwardly from the interior surface of first sidewall section 36 at a location in spaced relation to first rear wall section 34. Rear connecting post 40 is provided with a rear hole 42. Rear hole 42 is sized to receive a connecting post 70 which extends radially from second sidewall section 66 at a location in spaced relation to second rear wall section 64. Rear hole 42 is sized to mateably and frictionally engage connecting post 70 when first and second handle sections 30 and 60 are secured into the secured state shown in FIG. 3.

To further interconnect first and second handle sections 30 and 60, the second handle section 60 is provided with a opair of front connecting posts 72 which project outwardly of inner face 63 of front wall section 62 in the plane thereof. A plurality of mounting holes 74 are formed through flat inner face 33 of front wall section 32 and are spaced to receive connecting posts 72 when handle sections 30 and 60 are placed together.

In order to mount tool element 14 in handle assembly 16, cooperative engageable mounting means are formed on the inner end of shank 24 and on first and second handle sections 30 and 60. To this end, first handle section 30 is provided with a first central portion 44 which extends radially upwardly from first sidewall section 36 and is formed as an integral longitudinal extension of end portion 32. Second handle section 60 includes a second central portion 74 in the form of a radially upwardly extending, cylindrical post that has an upright mounting post 76 formed on upper shank support surface 78 thereof. Mounting post 76 is sized to be received through hole 26 in shank 24 and mate with a mounting bore 46 formed in upper shank support surface 48 of first central portion 44. To this end, surfaces 48 and 78 of the first and second central portions 44 and 74, respectively, are sized so that they are in closely spaced relation when handle sections 30 and 60 are placed in the assembled position. Surfaces 48 and 78 are spaced apart a distance to accommodate the thickness of shank 24 so that, in the assembled state, shank 24 is received and supported in close fitted engagement between surfaces 48 and 78 with post 76 passing through hole 26.

In order that inner faces 33 and 63 abut in the assembled state, a notch 50 is formed through front end wall portion 32, with this notch preferably being at the front of a longitudinal, axial channel 52 extending along first central portion 44 with a bottom of channel 52 forming upper surface 48 thereof. This structure then creates a rim 54 that extends around the edge of first central portion 44. Channel 52 is sized to receive shank 24 in close fitted engagement so that shank 24 nests within channel 52 in the assembled state. Thus, shank 24 extends through an opening formed by notch 50 in the end surface created by front wall sections 32 and 62 when handle assembly 16 is in the assembled state.

Even though shank 24 rests in channel 52, lateral forces sometimes tend to pivot shank 24 out of channel 54. Thus, in order to prevent excessive lateral or "angular" pivoting of the tool element 14, lateral stop means is provided on each side of notch 50. These lateral stop means are preferably formed by a pair of prongs 80 which are parallel to connecting post 72 on and extend perpendicularly of flat inner face 63. A pair of prog bores 82 are formed in flat inner face 33 of front wall section 32 and are sized and positioned on either side of notch 50 so that they will receive and engage prongs 80 when handle sections 30 and 60 are assembled together. Should tool 14 try to pivot through the region between inner faces 33 and 63, shank 24 will abut a prong 80 to prohibit such angular pivoting motion.

The present tool apparatus 12 is adapted to be snap-fit together to form a lightweight cutting instrument for delicate carving operations in soft materials. Also, tool apparatus 12 is designed to be disposable so that it is constructed as inexpensively as possible. To this end, handle sections 30 and 60 are preferably formed as single pieces of integrally molded plastic which may be snap-fit together in the assembled position engaging metallic tool element 14. In assembly, the user positions shank 24 within channel 52 of first handle section 30. While holding shank 24 in this position, the user secures second handle section 60 to first handle section 30 by simultaneously engaging post 70 and posts 72 in their respective holes 42 and 43. As this engagement occurs, mounting post 76 passes through hole 26 to be received in mounting hole 46 thus locking shank 24 against outward longitudinal movement. Similarly, prongs 80 become engaged in prong bores 82 on either side of shank 24 to provide the limit stop means. The connecting posts 70 and 72 are sized to frictionally engage their respective holes 42 and 43 to retain handle sections 30 and 60 together. The tool assembly 12 may then be used as desired and then discarded.

A first alternate embodiment of a tool apparatus is shown in FIG. 4 and is almost identical in structure to tool apparatus 12. However, in FIG. 3, tool apparatus 112 has a slightly different mounting means for tool element 114. In a manner similar to that described above, tool apparatus 112 includes a handle assembly 116 which is formed by a first handle section 130 and a second handle section 160 which complement each other and may be placed in an assembled state to receive and mount shank 124 of tool element 114. First handle section 130 is provided with a first central portion 144 formed as an integral extension of front wall section 132. First central portion 144 is provided with a channel 152 sized to receive shank 124 in close fitted engagement therein. Channel 152 is formed to provide an upper surface 148 that includes a mounting hole 146 at a central end thereof. Second central portion 174 is provided as a radially upward extension of second sidewall section 166 and terminates in an upper surface 178. In the embodiment shown in FIG. 4, however, mounting means are provided for shank 24 in the form of a pair of oppositely projecting fingers 125 which extend oppositely one another on either side of shank 124 adjacent inner end 128 thereof. One of fingers 125 is adapted to extend into and engage mounting hole 146 in first central portion 144. The other of fingers 125 is received and engages a second mounting hole 176 that is formed in upper surface 178 of second central portion 174.

A second alternate embodiment of the present invention is shown in FIG. 5. Here, tool element 214 is shown as a drill bit having a hexagonal shaped shank 224. In the embodiment shown in FIG. 5, a first handle section 230 is provided with a first central portion 244 extending upwardly from a first sidewall section 236 and is formed as an integral longitudinal extension of front wall section 232. Second handle section 260 is provided with a second central portion 274 formed upwardly from a second sidewall section 266 and as an integral longitudinal extension of second front wall section 262. First central portion 244 is provided with a channel 252, and second central portion 274 is provided with a channel 282 such that, when handle sections 230 and 260 are secured together in the assembled state, edges 245 and 275 of central portions 244 and 274 abut one another with channels 252 and 282 forming an elongated cavity to receive shank 224. To this end, channels 252 and 282 are formed by flat surface portions that correspond to the hexagonal shape of shank 224. Shank 224 is held in position by means of a pair of oppositely projecting fingers 225 which are respectively received in mounting holes 246 and 276, respectively formed in the bottoms of channels 252 and 282. Due to the thickness of shank 224, the limit stop means in the form of prongs, such as prongs 80, can be eliminated in the embodiment shown in FIG. 5. Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A hand-held tool apparatus adapted for cutting relatively soft materials, comprising a tool element having an elongated shank on one end thereof and a cutting element projecting oppositely of said shank along a tool axis, and an elongated handle assembly having a handle axis, front and rear surfaces extending transversely to said handle axis and an outer surrounding side surface extending between said front and rear surfaces, said handle assembly operative to receive said shank along said handle axis to mount said tool element so that the cutting element projects outwardly and forwardly of the front surface, said handle assembly being constructed of two complementary first and second handle sections, the first handle section having a first front end portion extending transversely of said handle axis and a first central portion extending inwardly from first side surface portion and the second handle section having a second front end portion extending transversely of said handle axis and having a second central portion extending inwardly from a second side portion, one of said first and second central portions having a longitudinal channel along said handle axis, said channel configured to receive the inner end of said shank in close-fitted engagement, securing means for securing said first and second handle section together whereby said first and second end portions form said front surface, said first and second central portions sized to have opposed internal faces spaced apart to receive and support an inner end of said shank in close-fitted engagement therebetween, said first and second front end portions configured whereby said front surface has an axial opening therethrough sized to receive said shank, and cooperative engageable mounting means on said inner end of said shank and said first and second central portions for lockably securing said shank within said handle assembly when said first and second handle sections are secured together.

2. A tool apparatus according to claim 1 wherein said one of said first and second central portions is formed as an integral longitudinal extension of its respective front end portion, said channel extending longitudinally from said opening, across the respective front end portion and along said one of said first and second central portions.

3. A tool apparatus according to claim 1 wherein both of said first and second central portions have longitudinal channels formed therein along said handle axis, said channels creating an elongated cavity when said first and second handle sections are secured together, said cavity configured to receive the inner end of said shank in close-fitted engagement.

4. A tool apparatus according to claim 1 including lateral stop means on each side axial opening for preventing angular pivoting of said shank past said lateral stop means on either side of said handle axis.

5. A handle-held tool apparatus adapted for cutting relatively soft materials, comprising a tool element having an elongated shank on one end thereof and a cutting element projecting oppositely of said shank along a tool axis, and an elongated handle assembly having a handle axis, front and rear surfaces extending transversely to said handle axis and an outer surrounding side surface extending between said front and rear surfaces, said handle assembly operative to receive said shank along said axis to mount said tool element so that the cutting element projects outwardly and forwardly of the front surface, said handle assembly being constructed of two complementary first and second handle sections, the first handle section having a first front end portion extending transversely of said handle axis and a first central portion extending inwardly from a first side surface portion and the second handle section having a second front end portion extending transversely of said handle axis and having a second central portion extending inwardly from a second side portion, securing means for securing said first and second handle sections together whereby said first and second end portions form said front surface, said first and second central portions sized to have opposed internal faces spaced apart to receive and support an inner eend of said shank in close-fitted engagement therebetween, said first and second front end portions configured whereby said front surface has an axial opening therethrough sized to receive said shank, cooperative engageable mounting means on said inner end of said shank and said first and second central portions for lockably securing said shank within said handle assembly when said first and second handle sections are secured together, lateral stop means on each side of said axial opening for preventing angular pivoting of said shank past said lateral stop means on either side of said handle axis, said lateral stop means including a pair of prongs extending from one of said front end portions and a pair of bores in the other of said front end portions configured to receive said prongs.

6. A tool apparatus according to claim 1 wherein said mounting means includes a hole through said shank, a mounting post on one of said central portions and a mounting bore on the other of said central portions whereby said mounting post will extend through said hole and engage said mounting bore to lock said shank in said housing assembly when said handle sections are secured together.

7. A handle-held tool apparatus adapted for cutting relatively soft materials, comprising a tool element having an elongated shank on one end thereof and a cutting element projecting oppositely of said shank along a tool axis, and an elongated handle assembly having a handle axis, front and rear surfaces extending transversely to said handle axis and an outer surrounding side surface extending between said front and rear surfaces, said handle assembly operative to receive said shank along said handle axis to mount said tool element so that the cutting element projects outwardly and forwardly of the front surface, said handle assembly being constructed of two complementary first and second handle sections, the first handle section having a first front end portion extending transversely of said handle axis and a first central portion extending inwardly from a first side surface portion and the second handle section having a second front end portion extending transversely of said handle axis and having a second central portion extending inwardly from a second side portion, securing means for securing said first and second handle sections together whereby said first and second end portions form said front surface, said first and second central portions sized to have opposed internal faces spaced apart to receive and support an inner end of said shank in close-fitted engagement therebetween, said first and second front end portions configured whereby said front surface has an axial opening therethrough sized to receive said shank, cooperative engageable mounting means on said inner end of said shank and said first and second central portions for lockably securing said shank within said handle assembly when said first and second handle sections are secured together, said mounting means including first and second fingers projecting oppositely one another and perpendicularly to said shank, there being a finger on each side of said shank, and first and second finger holes in said first and second central portions, respectively, sized and oriented to receive and retain said fingers when said handle sections are secured together.

8. A tool apparatus according to claim 1 wherein said housing incudes a radially outwardly projecting lip extending completely therearound adjacent first front surface.

9. A tool apparatus according to claim 1 wherein said surrounding sidewall is formed of a plurality of flat longitudinal side surface portions whereby said housing has the shape of a polygonal prism.

10. A hand-held tool apparatus adapted for cutting relatively soft materials, comprising a tool element having an elongated, flat, plate-like shank forming one end thereof and a cutting element projecting oppositely of said shank and an elongated hollow handle assembly having an interior, an exterior and a longitudinal handle axis, said handle assembly including a front wall, a rear wall and a surrounding sidewall, said handle assembly adapted to receive said shank to mount said tool element such that said cutting element projects forwardly of said front wall along said handle axis, said handle assembly being constructed in an assembled stated of complementary first and second handle sections respectively having first and second front wall sections, first and second rear wall sections and first and second sidewall sections such that said first and second handle sections have first and second rims, respectively, configured to abut one another when said first and second handle sections are secured together in the assembled state, said first handle section including a first central portion formed as an integral longitudinal extension of said first wall section, and projecting upwardly therefrom to a location adjacent said handle axis, and having a longitudinal channel forming a first shank support surface, said second handle section including a second central portion formed integrally with said second sidewall section and projecting upwardly therefrom to a location adjacent said handle axis to form a second shank support surface whereby said first and second shank support surfaces are spaced apart from one another to receive and support opposite sides of said shank in the assembled state, said front wall having an axially opening formed therethrough by said longitudinal channel of said first central portion such that said shank may extend into the interior of said housing assembly to be supported on opposite sides by said first and second shank support surfaces, said first and second handle sections including cooperative securing means which engage one another for securing said first and second handle sections in the assembled state, and cooperative engageable mounting means on said inner end of said shank and said first and second central portions for lockably securing said shank within said handle assembly when said first and second handle sections are secured together.

11. A hand-held tool apparatus according to claim 10 wherein said second central portion is formed as a post.

12. A hand-held tool apparatus according to claim 1 wherein said securing means includes a pair of front connecting posts projecting upwardly from one of said front wall sections and a pair of front holes formed in the other of said front wall sections sized to mateably engage said front connecting posts.

13. A hand-held tool apparatus according to claim 12 wherein said securing means further includes a first rear connecting post extending upwardly from said first sidewall section between said first central portion and said first rear wall section and a second rear connecting post extending upwardly from said second sidewall section between said second central portion and said second rear wall section, one of said rear connecting posts being larger than the other and provided with a rear hole sized to mateably receive the other of said rear connecting posts.

14. A hand-held tool apparatus according to claim 10 including lateral stop means on each side of said axial opening for preventing angular pivoting of said shank past said lateral stop means on either side of said handle axis.

15. A hand-held tool apparatus according to calim 14 said lateral stop means includes a pair of prongs extending from one of said end portions and a pair of bores in the other of said end portions configured to receive said prongs.

16. A hand-held tool apparatus according to claim 10 said mounting means includes a hole through said shank, a mounting post on one of said central portions and a mounting bore on the other of said central portions whereby said post will extend through said hole and engage said mounting bore to lock said shank in said housing assembly when said handle sections are secured together.

17. A hand-held tool apparatus adapted for cutting relatively soft materials, comprising a tool element having an elongated, flat, plate-like shank forming one end thereof and a cutting element projecting oppositely of said shank and an elongated hollow handle assembly having an interior, an exterior and a longitudinal handle axis, said handle assembly including a front wall, a rear wall and a surrounding sidewall, said handle assembly adapted to receive said shank to mount said tool element such that said cutting element projects forwardly of said front wall along said handle axis, said handle assembly being constructed in assembled stated of complementary first and second handle sections respectively having first and second front wall sections, first and second rear wall sections and first and second sidewall sections such that said first and second handle sections have first and second rims, respectively, configured to abut one another when said first and second handle sections are secured together in the assembled state, said first handle section including a first central portion formed integrally with said first sidewall section and projecting upwardly therefrom to a location adjacent said handle axis, to form a first shank support surface, said second handle section including a second central portion formed integrally with said second sidewall section and projecting upwardly therefrom to a location adjacent said handle axis to form a second shank support surface whereby siad first and second shank support surfaces are spaced apart from one another to receive and support opposite sides of said shank in the assembled state, said front wall having an axially opening formed therethrough such that said shank may extend into the interior of said housing assembly to be supported on opposite sides by said first and second shank support surfaces, said first and second handle sections including cooperative securing means which engage one another for securing said first and second handle sections in the assembled state, and cooperative engageable mounting means on said inner end of said shank and said first and second central portions for lockably securing said shank within said handle assembly when said first and second handle sections are secured together said mounting means including first and second fingers projecting oppositely one another and perpendicularly to said shank, there being a finger on each side of said shank, and first and second finger holes in said first and second central portions, respectively, sized and oriented to receive and retain said fingers when said handle sections are secured together.

18. A hand-held tool apparatus according to claim 10 said housing incudes a radially outwardly projecting lip extending completely therearound adjacent first front surface.

* * * * *

UNITED STATES PATENT AND TRADEMARK OFFICE
CERTIFICATE OF CORRECTION

PATENT NO. : 4,841,638

DATED : June 27, 1989

INVENTOR(S) : John P. Bardeen and Jerry K. Ellefson

It is certified that error appears in the above-identified patent and that said Letters Patent is hereby corrected as shown below:

Column 1, after "BACKGROUND OF THE INVENTION", insert
--The present invention relates to a cutting tool apparatus, and this invention particularly relates to a small, hand-held cutting tool which is light in weight and easily manipulated for use in cutting relatively soft materials. While the present invention is useful for cutting a variety of soft materials, the cutting tool apparatus described herein is especially useful for the decorative carving of pumpkins.--

Column 2, line 26, delete "downwaardly", substitute --downwardly--.

Column 3, line 28, delete "sidewaall", substitute --sidewall--.

Column 3, line 39, delete first occurrance of "of", substitute --off--..

Column 3, line 58, delete "opair", substitute --pair--.

Column 4, line 40, delete "prog", substitute --prong--.

Column 5, line 10, delete "complement", substitute --compliment--.

Column 5, line 57, after "FIG.5", begin new paragraph with --Accordingly,--.

Column 6, line 51, after "side", insert --of said--.

UNITED STATES PATENT AND TRADEMARK OFFICE
CERTIFICATE OF CORRECTION

PATENT NO.　:　4,841,638
DATED　　　:　June 27, 1989
INVENTOR(S):　John P. Bardeen and Jerry K. Ellefson It is certified that error appears in the above-identified patent and that said Letters Patent is hereby corrected as shown below:

Column 6, line 54, delete "handle", substitute --hand--.

Column 6, line 63, after "said", insert --handle--. (first occur.)

Column 7, line 10, delete "eend", substitute --end--.

Column 7, line 33, delete "handle", substitute --hand--.

Column 10, line 37, delete "incudes", substitute --includes--.

Signed and Sealed this

Ninth Day of April, 1991

Attest:

HARRY F. MANBECK, JR.

*Attesting Officer*　　　*Commissioner of Patents and Trademarks*